United States Patent Office 2,948,784
Patented Aug. 9, 1960

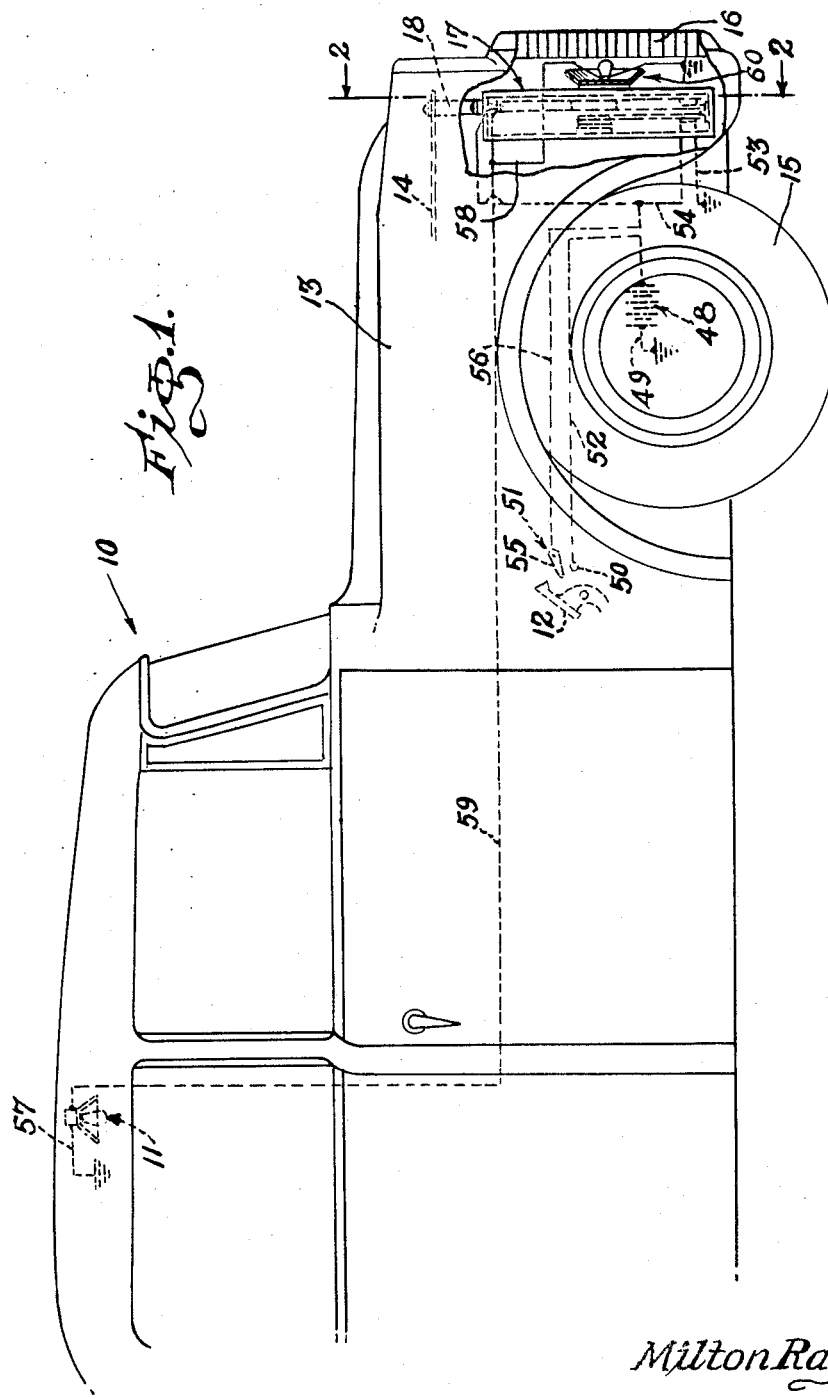

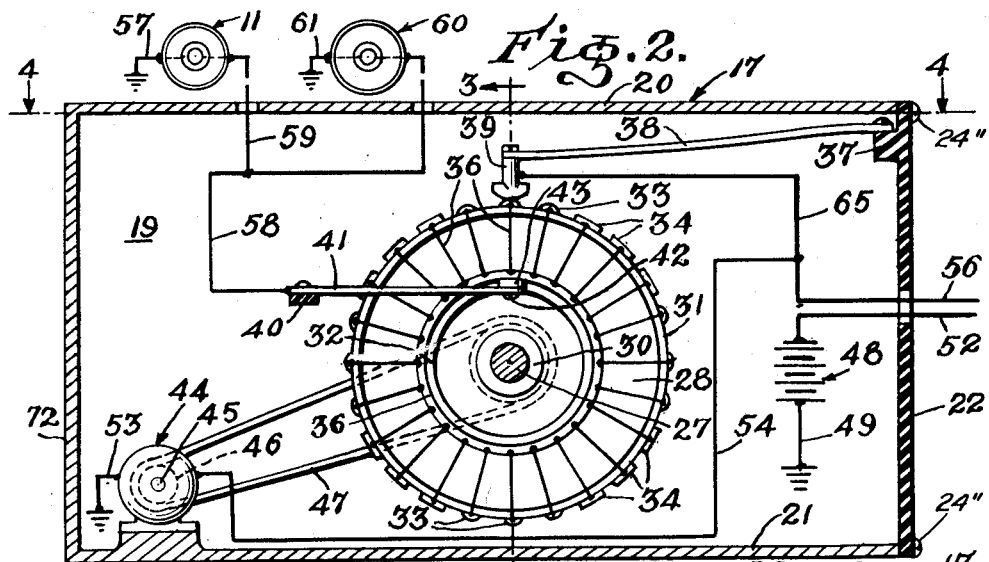
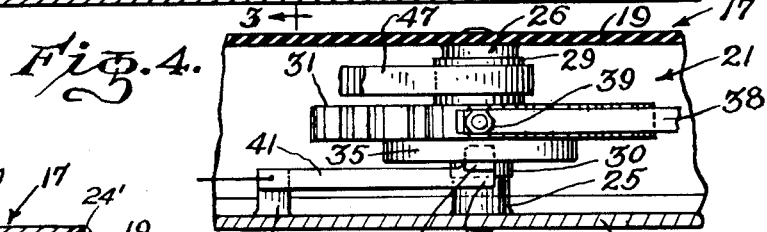
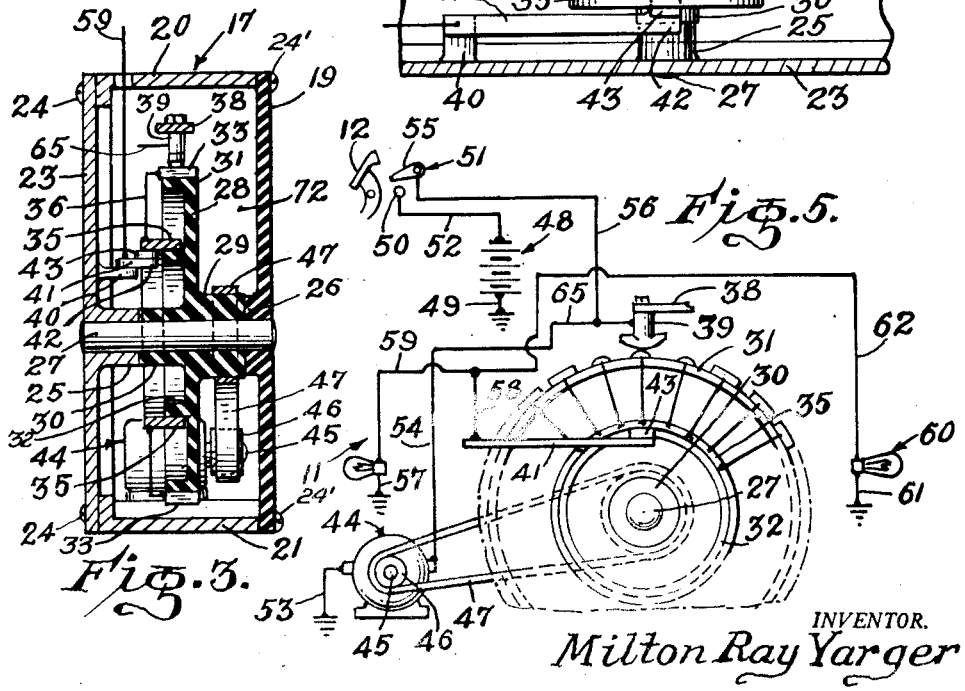

2,948,784

SIGNAL TRANSMITTER FOR AUTOMOBILES—SOS FLASHER

Milton R. Yarger, 300 1st St., Morgantown, W. Va.

Filed Oct. 24, 1956, Ser. No. 617,968

3 Claims. (Cl. 200—28)

This invention relates to a signal transmitter for automobiles.

It is an object of the present invention to provide a visual warning signal for automobiles which includes a secretly located switch and wherein upon closing of said switch, a series of warning flashes will automatically emanate from the vehicle, these flashes being preferably arranged with three short flashes followed by three long flashes so as to signal in the Morse code the letters SOS.

It is another object of the present invention to provide a signal transmitter for automobiles of the above type which may be easily and readily installed in conventional automobiles without changing the structure thereof, and wherein the operating switch is positioned below the brake pedal so as to be closed in an unsuspected manner by the motorist when he is attacked and also to indicate visually that there is a failure in the brake line.

Other objects of the invention are to provide a warning signal transmitter for automobiles bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a side elevational view of a preferred embodiment of the present invention shown in operative use;

Fig. 2 is an enlarged front elevational view of the invention taken along the line 2—2 of Fig. 1;

Fig. 3 is a vertical sectional view taken along the line 3—3 of Fig. 2;

Fig. 4 is a top plan view of the device taken along the line 4—4 of Fig. 2; and

Fig. 5 is a circuit diagram of the invention.

Referring now more in detail to the drawing, and more particularly to Fig. 1, 10 indicates generally an automobile of any suitable type or make, including the usual interior lamp indicated generally at 11, the brake pedal 12, the hood portion 13, the interior frame member 14, the wheels 15 and the grill 16, substantially as illustrated.

In the practice of my invention a closed rectangular housing indicated generally at 17 is provided and may be suitably mounted behind the grill 16 being supported from the frame member 14 by means of the brackets 18 (Fig. 1). Any other suitable location within the vehicle may, of course, be provided, as will be apparent to those skilled in the art.

As shown in Figs. 2 through 4, the housing 17 includes the rectangular rear wall 19, the top wall 20, the rectangular bottom wall 21 and the rectangular end walls 22 and 72. Said front wall 19 and said end wall 22 being constructed of an electrically non-conductive material. A removable front wall 23 is mounted across the housing by means of the fastening means 24 and is integrally formed on its inner face with the centrally located, inwardly extending hub portion 25 which cooperates with the inwardly extending hub portion 26 formed on the inner face of the rear wall 19 to rotatably mount the shaft 27 (Fig. 3). The walls 19 and 22 secured with adjacent walls by screws 24' and 24" respectively.

A circular plate 28 is rotatably mounted on the shaft 27 in spaced relationship to the rear wall 19 by means of the integrally formed, rearwardly extending hub portion 29 which receives therethrough the shaft 27, the rear end of which abuts the bearing or hub portion 26. The front face of the plate 28 is also integrally formed with the forwardly extending hub portion 30 which rotatably receives therethrough the shaft 27 and which abuts the rear end of the hub portion 25 whereby to retain the plate 28 in the centrally located position, as will be obvious. The periphery of the plate 28 is integrally formed with the forwardly extending, hollow cylindrical side wall 31, and concentric therewith, the forward face of the plate 28 is formed with the hollow cylindrical portion 32, the forward edge of the central hollow cylindrical portion 32 lying in the same vertical plane as the forward edge of the side wall 31.

The plate 28, the hub portions 30 and 29 thereof and the cylindrical portions 31 and 32 are all formed of electrically non-conductive material, preferably integrally.

For a purpose which will hereinafter become clear, a plurality of contacts of electrically conductive material are mounted on the outside of the peripheral wall 31 and are preferably arranged in the dots 33 and the elongated dashes 34, the sequence being three dots followed by three dashes.

A hollow cylindrical sleeve type conductor member 35 of electrically conductive material is mounted on the hollow cylindrical portion 32, extending forwardly thereof (Fig. 3). The conductor 35 is fixedly secured to the cylindrical portion 32 in suitable manner and is connected to each of the dots 33 and dashes 34 by means of the radially extending, angularly spaced conductors 36.

The housing 17 has two walls formed of electrically non-conductive material, said walls 19 and 22, the end wall 22 thereof on the interior at the top is integrally formed with the bracket 37 which mounts the spring strip 38 which terminates above the top center of the peripheral wall 31 in the T-shaped contact 39 having a curved undersurface which rides continuously on the dots and dashes 33 and 34 upon rotation of the wheel, the contact 39 being formed of electrically conductive material.

The front wall 23 fixedly mounts the inwardly extending bracket 40 which supports thereon the elongated rectangular spring strip 41 of electrically conductive material, the other end of which terminates in front of the center of the conductor 35 just below the top inner surface of the latter and is integrally formed at right angles thereto with the inwardly extending portion 42 which lies within the periphery of the contact 35 and is in electrical contact with the inner surface thereof by means of the contact 43 having a curved surface for continuous contact with the conductor 35.

As shown in Fig. 2, an electric motor indicated generally at 44 is mounted on the bottom wall 21 at one end thereof and includes the drive shaft 45 on which is mounted the pulley 46, the pulley 46 being connected to the hub portion 29 of the wheel by means of the friction belt 47 whereby upon operation of the motor to rotate the wheel in a counter-clockwise direction.

As shown in Fig. 5, a storage battery indicated generally at 48 is provided and has one terminal thereof grounded by the conductor 49. The other terminal of the storage battery 48 is connected to the terminal 50 of a concealed switch indicated generally at 51 by means of the conductor 52.

One terminal of the electric motor 44 is grounded by the conductor 53 while the other terminal thereof is connected to the contact 39 by means of the conductor 54. The movable arm 55 of the switch 51 is connected to the conductor 54 by means of the conductor 56. Thus, upon closing the switch 51, the motor 44 will operate the wheel through the circuit described.

One terminal of the electric lamp means 11 is grounded by the conductor 57 while the other terminal thereof is connected to the conductor strip 41 by means of the conductor 58, the conductor 58 being connected to the lamp by means of the conductor 59. Thus, the circuit of the electric lamp means 11 will be completed through the conductors 59, 58, the conductor strip 41, the contact 43, the contact 35, the conductors 36, the dots or dashes 33 or 34 (when in contact with the contact 39) contact 39, contact conductor 56, switch 51 and storage battery 48, the circuit of the lamp being closed only when the contact 39 is in contact with tone of the dots or dashes 33 and 34.

A second electrical lamp means indicated generally at 60 is suitably mounted behind the grill 16 and is connected in parallel with the electric lamp means 11. For example, one terminal of the electric lamp means 60 is grounded by the conductor 61 while the other terminal thereof is connected to the conductor 59 and conductor 58 by means of the conductor 62, to operate in a similar fashion simultaneously with the lamp means 11, as will be obvious. Finally, the contact 39 is connected to the other terminal of the motor 44 by means of the conductor 65 to complete the circuit.

The switch 51 is preferably located between the brake pedal 12 so that upon depressing the latter, the switch will be closed to actuate the warning device. Other locations may, of course, be provided, for example on the steering wheel; however, the position shown has the advantage of signalling the motorist when the brake fluid has been lost through a leak.

In operation, the depression of the brake pedal 12 during the presence of burglars or other unauthorized persons attempting to enter the car unlawfully closes the switch 51 which automatically starts the motor 44, this causes the wheel to rotate in the counter-clockwise direction. As the contact 39 comes into physical contact with each of the contacts 33 or 34, the circuit of the two lamps will be completed to cause the same to flash. Due to the arrangement and the length of the dots and dashes 33 and 34, the flashing will be three short followed by three long and so forth to simulate visually an SOS warning signal based on the Morse code. Any other system of signalling may, of course, be provided by varying the spacing of the contacts 33 and 34 and their length.

The invention is particularly designed for use on taxicabs, by bank messengers as well as for general use.

The plate carrying the contacts may, of course, be driven by any other suitable means than the pulley belt shown, for example, a direct gear drive may be used.

While various changes may be made in the detail construction, it shall be understood that such changes shall be within the spirit and scope of the present invention as defined by the appended claims.

What I claim as new and desire to protect by Letters Patent of the United States is:

1. A signal transmitter for automobiles or the like comprising a substantially circular plate of electrically non-conductive material, means rotatably mounting said plate about its central axis, said means comprising a rectangular housing having front and rear, top and bottom walls, aligned bearing members on the inner face of said front and rear walls, a shaft mounted within said bearing members and connecting the same, said bearing members being spaced apart, said plate having a central rearwardly extending hub rotatably mounting said shaft with the rear end of said hub abutting said rear wall bearing, said plate having a forwardly extending hub portion receiving said shaft therethrough and abutting the rear end of said front wall bearing, a plurality of angularly spaced electrical contacts mounted on the periphery of said plate, a hollow cylindrical conductor of less diameter than said plate mounted on one face thereof concentric therewith, a plurality of angularly spaced, radially extending conductors connecting each of said first contacts with said cylindrical conductor, a stationary contact adapted to contact said first contacts upon rotational motion of said plate continuously, a second stationary contact continuously contacting said cylindrical conductor during rotation of said plate and electric motor means for rotating said plate.

2. A signal transmitter for automobiles or the like comprising a substantially circular plate of electrically non-conductive material, means rotatably mounting said plate about its central axis, said means comprising a rectangular housing having front and rear, top and bottom walls, aligned bearing members on the inner face of said front and rear walls, a shaft mounted within said bearing members and connecting the same, said bearing members being spaced apart, said plate having a central rearwardly extending hub rotatably mounting said shaft with the rear end of said hub abutting said rear wall bearing, said plate having a forwardly extending hub portion receiving said shaft therethrough and abutting the rear end of said front wall bearing, a plurality of angularly spaced electrical contacts mounted on the periphery of said plate, a hollow cylindrical conductor of less diameter than said plate mounted on one face thereof concentric therewith, a plurality of angularly spaced, radially extending conductors connecting each of said first contacts with said cylindrical conductor, a stationary contact adapted to contact said first contacts upon rotational motion of said plate continuously, a second stationary contact continuously contacting said cylindrical conductor during rotation of said plate and electric motor means for rotating said plate, said circular plate around its periphery being integrally formed with a hollow cylindrical side wall, said angularly spaced contacts mounted on said side wall on the outside thereof, a spring strip mounted at one end of the inside of one of said end walls at the top thereof, said first stationary contact being mounted on the other end of said strip and having a curved under surface bearing on said angularly spaced contacts, and a second elongated conductor strip mounted at one end on the inner face of said front wall and extending towards said contact and terminating below the central portion of the same, said second contact strip terminating in an inwardly extending portion extending inwardly within said cylindrical contact and having a contact thereon comprising said second stationary contact, the upper surface of said second stationary contact being curved to correspond with the interior of said cylindrical contact.

3. A signal transmitter according to claim 2, said electric motor means comprising an electric motor having a drive shaft mounted on said bottom wall on one end of the housing, a pulley on said drive shaft and a friction belt connecting said motor pulley with the rearwardly extending hub portion of said plate.

References Cited in the file of this patent

UNITED STATES PATENTS

| 717,768 | Shoemaker | Jan. 6, 1903 |
| 1,993,497 | Wells | Mar. 5, 1935 |
| 2,146,271 | Schaefer | Feb. 7, 1939 |
| 2,650,354 | Joiner | Aug. 25, 1952 |

FOREIGN PATENTS

| 509,963 | Belgium | Mar. 31, 1953 | of the master and control the depth of cut produced by said cutter head, means including a closed fluid circuit having a first bellows for displacing fluid in said circuit and a second bellows connected to the master contacting means for varying the relative position of the master contacting means and cutter head to vary the depth of cut in accordance with the displacement of the fluid, and anticipating means controlled by said signal for operating the first bellows to displace said fluid to vary the depth of cut in accordance with the signal to be recorded.

References Cited in the file of this patent

UNITED STATES PATENTS

| | | |
|---|---|---|
| 2,112,699 | Kleber | Mar. 29, 1938 |
| 2,284,744 | Kellogg | June 2, 1942 |
| 2,847,514 | Evans | Aug. 12, 1958 |
| 2,867,694 | Pearson | Jan. 6, 1959 |

FOREIGN PATENTS

| | | |
|---|---|---|
| 770,465 | Great Britain | Mar. 20, 1957 |